United States Patent
Aijaz et al.

(10) Patent No.: US 10,740,110 B2
(45) Date of Patent: Aug. 11, 2020

(54) SYSTEMS AND METHODS FOR PROVIDING CONTROL OF APPLICATION EXECUTION

(71) Applicant: Split Software, Inc., Redwood City, CA (US)

(72) Inventors: Adil Aijaz, San Mateo, CA (US); Patricio Echague, Redwood City, CA (US); Trevor Stuart, San Mateo, CA (US)

(73) Assignee: SPLIT SOFTWARE, INC., Redwood City, CA (US)

( * ) Notice: Subject to any disclaimer, the term of this patent is extended or adjusted under 35 U.S.C. 154(b) by 208 days.

(21) Appl. No.: 15/198,498

(22) Filed: Jun. 30, 2016

(65) Prior Publication Data

US 2018/0004507 A1 Jan. 4, 2018

(51) Int. Cl.
*G06F 9/445* (2018.01)
*G06F 8/71* (2018.01)

(52) U.S. Cl.
CPC ............ *G06F 9/44505* (2013.01); *G06F 8/71* (2013.01); *Y02D 10/43* (2018.01)

(58) Field of Classification Search
CPC ....................................................... G06F 8/60
See application file for complete search history.

(56) References Cited

U.S. PATENT DOCUMENTS

| | | | | |
|---|---|---|---|---|
| 7,926,053 B1* | 4/2011 | Rowe | ................. | G06F 8/61 702/119 |
| 7,958,234 B2* | 6/2011 | Thomas | ............. | G06F 11/3438 709/202 |
| 9,510,141 B2* | 11/2016 | Soto Matamala | ...... | H04W 4/21 |
| 9,600,262 B2* | 3/2017 | Assuncao | ........... | G06F 9/45558 |
| 10,379,838 B1* | 8/2019 | Chud | ................... | G06F 11/076 |
| 10,587,729 B1* | 3/2020 | Jain | ....................... | G06F 3/0481 |
| 2010/0318986 A1* | 12/2010 | Burke | ................. | G06F 11/3409 717/176 |
| 2014/0208088 A1* | 7/2014 | Somani | ............... | G06F 9/44505 713/1 |
| 2016/0063379 A1* | 3/2016 | Adderly | .................. | G06N 5/04 706/11 |
| 2016/0132314 A1* | 5/2016 | Solsona-Palomar | ...... | G06F 8/65 717/172 |
| 2016/0259635 A1* | 9/2016 | El Maghraoui | ........... | G06F 8/65 |
| 2016/0274893 A1* | 9/2016 | Thomas | ................... | G06F 8/61 |

(Continued)

*Primary Examiner* — Wei Y Zhen
*Assistant Examiner* — Brahim Bourzik
(74) *Attorney, Agent, or Firm* — Womble Bond Dickinson (US) LLP

(57) ABSTRACT

A method and apparatus for enabling control of execution of software applications is described. The method may include receiving an identifier for a user system, an identifier of a feature of an application running on the user system, and one or more definition values that define a treatment to be applied to the application feature. The method may also include storing the identifier for the user system, the identifier of the feature of an application running on the user system, and the definition values to be applied to the application feature. Furthermore, the method may include applying the definition values to the application feature at the user system based on the identifier for the user system stored in the memory, wherein the definition values configures the feature within the application while the application is running at the user system.

25 Claims, 8 Drawing Sheets

(56) References Cited

U.S. PATENT DOCUMENTS

2016/0337211 A1* 11/2016 Singh .................... H04L 43/067
2018/0011771 A1* 1/2018 Schimmelpfeng ........ G06F 8/65
2019/0312800 A1* 10/2019 Schibler .............. H04L 41/0823

* cited by examiner

SYSTEMS AND METHODS FOR PROVIDING CONTROL OF APPLICATION EXECUTION

TECHNICAL FIELD

Embodiments of the invention relate to the field of software application development and deployment, and more particularly, to enabling control of execution of software applications.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface based on experiences and/or feedback of real world users of the application. As yet another example, a software application may be optimized to run more efficiently in terms of start times, power usage, function execution, etc. There are many other examples of why software applications are updated by software developers.

An update is typically distributed to all end users of the software application after internal testing by the software developer as a software update. However, once an update is installed and executed on the end user computer systems, there may be unforeseen consequences. Similar to the examples above, the update may cause unforeseen bugs in the software application when operating in the real world, may cause a decline in one or more efficiencies of the software application and/or user computer system, may not be received well by end users when actually using the updated software application, as well as other reasons why a developer might be unsatisfied with an update after it is deployed.

Once a software application is installed and/or running on end user computer systems, it may be difficult or impossible to reverse an update with unforeseen real world consequences. Furthermore, testing of the software applications in real world environments is difficult due to the need to distribute the updates to end users while maintaining control over the updates.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
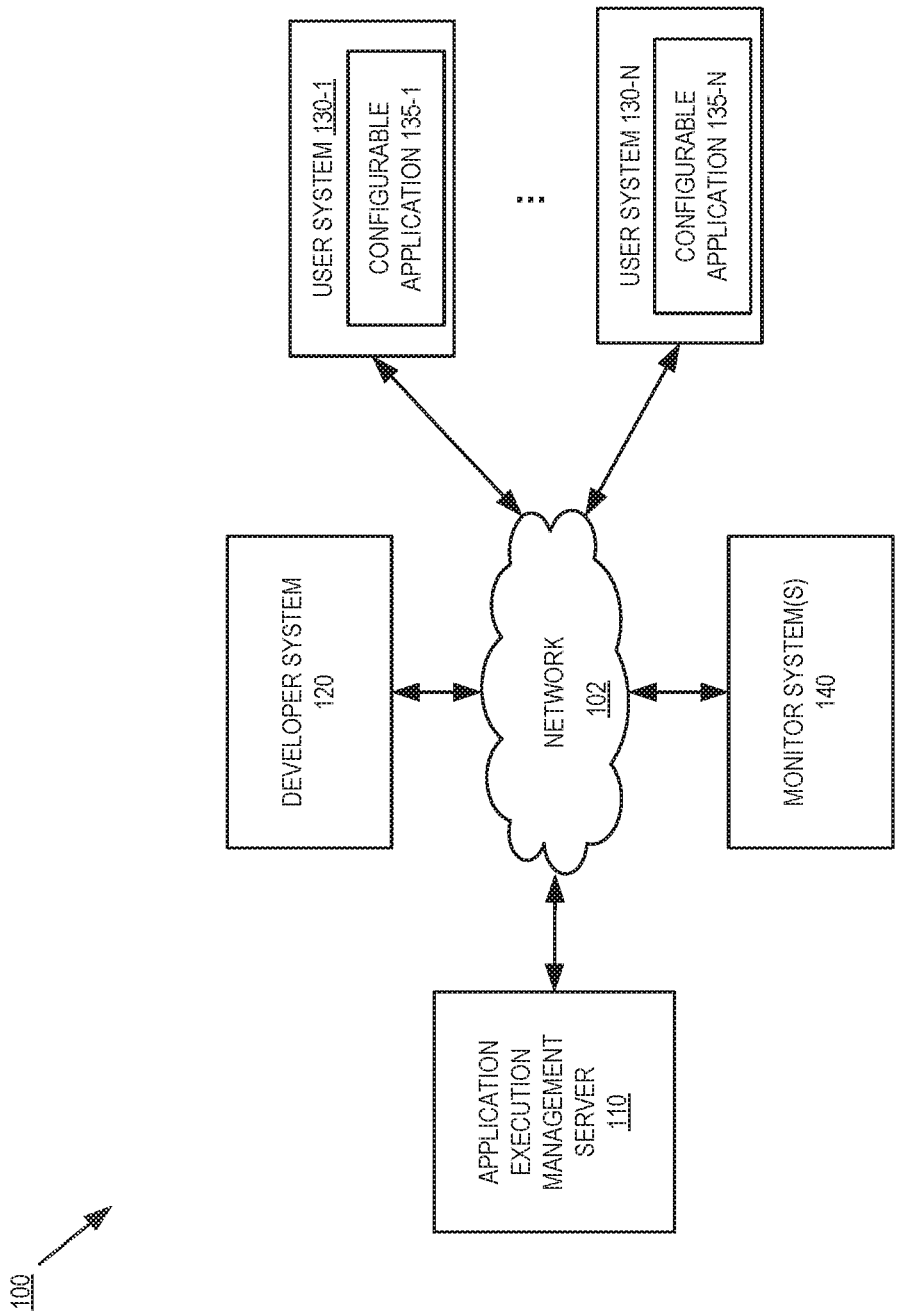
FIG. 1 is a block diagram of an exemplary system architecture for providing control of application execution.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "storing", "providing", "accessing", "comparing", "detecting", "performing", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing control of application execution.

In one embodiment, the system 100 includes a plurality of user systems, such as user system 130-1 to user system 130-N, application execution management server 110, and a developer system 120. In one embodiment, the system 100 may also include one or more monitor system(s) 140. In one embodiment, user system 130-1 to user system 130-N may be personal computing devices, such as a desktop computer, laptop computer, tablet computer, mobile computing device, mobile communication device, etc. The application execution management server 110, developer system 120, and monitor system(s) 140 may also be computing devices, such as server computers, desktop computers, etc.

The user systems 130-1 through 130-N, application execution management server 110, developer system 120, and monitor system(s) 140 may be coupled to a network 102 and communicate with one another using any of the standard protocols for the exchange of information. In one embodiment, one or more of the user systems 130-1 through 130-N, application execution management server 110, developer system 120, and monitor system(s) 140 may run on one Local Area Network (LAN) and may be incorporated into the same physical or logical system, or different physical or logical systems. Alternatively, the user systems 130-1 through 130-N, application execution management server 110, developer system 120, and monitor system(s) 140 may reside on different LANs, wide area networks, cellular telephone networks, etc. that may be coupled together via the Internet but separated by firewalls, routers, and/or other network devices. In yet another configuration, the application execution management server 110, developer system 120, and monitor system(s) 140 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, user systems 130-1 through 130-N execute applications, such as configurable applications 135-1 through 135-N. The configurable applications may include any type of software application such as an application downloaded to, installed on, and run on a user system, a web based application downloaded from a server computer system and run on a user system, a mobile application where the user system is a mobile device, as well as other types of software applications. Configurable applications 135-1 through 135-N, as will be discussed herein, may be configured using application execution management server 110 to control how one or more features are treated during execution of the application. For example, a feature may be turned on or turned off by application execution management server 110 for execution by one or more user systems 130-1 through 130-N, such as activation of a user interface element, activation of an application capability, etc. As another example, a value may be set by application execution management server 110 within an application that impacts how the application is executed by a user system, such as specifying between different credit cards that can be accepted in a merchant user interface of the application. As yet another example, appearance of a user interface may be altered by application execution management server 110. Further treatments for configuring the execution of software applications by user systems may be performed in accordance with the discussion herein. Furthermore, each of user systems 130-1 through 130-N may execute the same or different applications having the same and/or different treatments applied by application execution management server 110. For ease of discussion, and to avoid obscuring embodiments set forth herein, the remaining discussion will assume that the configurable applications 135-1 through 135-N are the same application.

In one embodiment, configurable applications 135-1 through 135-N are prepared for management by application execution management server 110 by a developer of the application, such as by developer system 120. In one embodiment, a user of developer system 120 includes feature treatment logic within each application 135-1 through 135-N. Optionally, a user of developer system 120 may configure the application to communicate with a software development kit (SDK) (not shown) that is either within each application 135-1 through 135-N or remotely located at, for example, developer system 120, a web server (not shown) providing the application of developer system, etc. The SDK and documentation for inserting the feature treatment logic within the code of an application may be downloaded from application execution management server 110. As will be discussed in greater detail below, the SDK is a software development tool responsible for communicating with application execution management server 110 on a periodic basis for acquiring definitions that enable selection between configurable application features, and logic within the application's code for executing a feature specified in the acquired definitions. Developer system 120 inserts the feature treatment logic into the applications to enable runtime configuration of application features, such as the ability to selectively enable features, selectively turn features on/off, selectively change a user interface and/or the elements contained therein, etc. Furthermore, developer system 120 may insert the SDK into the applications running on user computer systems 130, or may alternatively run an SDK on a remote system (e.g., a web server) when applications are provided to the user systems from the remote system (e.g., a configurable web page application). This enables developer system 120 the ability to test software features at user systems 130-1 through 130-N on a select basis, for example by activating a feature on a select group of user systems, to roll out a feature slowly over a set period of time, to turn off features that are not behaving as expected, etc.

In one embodiment, developer system 120 accesses application execution management server 110 via user interface, such as a web based user interface, for selecting application configuration parameters (e.g., to set application execution definitions). The application configuration parameters may include selection of specific segment of user systems by a developer system 120, such as a selection of random user systems, selection of specific user system types (e.g., mobile versus desktop), selection of regions of users (e.g., North American versus South American), etc. For the selected segment(s) of user system(s), the developer system 120 may then select a treatment for one or more application features. The treatment, as discussed herein, is how a feature will be configured when executed by a software application on a user computer system based on the definitions set by a developer system 120. For example, a first group of user systems 130 that are mobile devices will execute function X in a user interface element of a configurable application 135, while a second group of user systems 130 that are desktop computer systems will execute function Y in the same user interface element of a configurable application 135. As another example, a specifically selected test group of user systems 130 may have a new feature turned on in their configurable applications 135, while user systems 130 not in the test group do not have the feature turned on in their configurable applications 135. As illustrated by these examples, developer system 120 may select any subgroup of user systems 130-1 through 130-N for application of a specific treatment of a configurable application's 135 execution. In one embodiment, subgroups are referred to as segments of the users of a configurable application, where segments (e.g., test groups, users in geographic regions, service subscribers, etc.) are defined by the developer system 120 so that definitions can be applied to defined segments. Furthermore, the selection of who receives treatments, how treatments are rolled out or rolled back, etc. enables developer system 120 to control testing application features, turn off application features that may have unforeseen bugs, control improper networking, bandwidth consumption, power usage, and other unforeseen side effects of selectively executed application features, etc. Thus, the developer system 120 maintains a great deal of control over how their configurable applications 135 are run and tested on user systems 130.

Application execution management server 110 maintains the developer system 120 specification of one or more user systems 130 and corresponding configurable application 135 treatments. In one embodiment, a system associated with developer system 120 (e.g., a web server) and/or configurable applications 135-1 through 135-N periodically query application execution management server 110 for treatment definitions. The definitions identify configurable features in applications and their configured values. For example, when configurable application 135-1 queries application execution management server 110 for definitions, application execution management server 110 may respond with identifiers of certain features and the treatment values of those features to, for example, turn a feature on or off, select between different functions of a feature, alter the appearance of a feature, etc. Furthermore, when configurable application 135-N queries application execution management server 110 for definitions, it will receive its own definitions that define how its configurable features are treated at execution of the configurable application 135-N. As yet another example, a web server associated with developer system 120 may periodically query application execution management server 110 for definitions, which may specify application of a treatment to all users who download a web based application, application of different treatments to specified groups/segments of users, etc. As discussed herein, the definitions identifying features and corresponding treatments may be the same or different for different user computer systems 130 based on the selection and specification of developer system 120.

In one embodiment, the system of FIG. 1 further includes monitor system(s) 140. The monitor system(s) 140 detect, measure, and collect data relating to one or more factors on user systems 130 before and after execution of configurable applications 135. The factors detected, measured, and collected may include bandwidth consumption, memory usage, application load times, application speed, etc. In one embodiment, monitor system(s) 140 are one or more systems that remotely monitor the performance of configurable applications 135-1 through 135-N. The monitor system(s) 140 may include third party monitoring services, such as network bandwidth consumption detection systems, services that monitor load times of web pages, etc. The monitor system(s) 140 may also be part of developer system 120, application execution management server 110, and/or user systems 130. Furthermore, a combination of third party, developer 120, application execution management server 110, and user system 130 monitoring systems may be used consistent with the discussion herein.

The data collected by monitor system(s) 140 is reported to application execution management server 110. Alternatively, monitor system(s) 140 store the data, such as time based snapshots, system performance statistics, etc. for later accessing by application execution management server 110. In one embodiment, the data collected by monitor system(s) 140 is further enhanced with optional impressions data reported to application execution management server 110 by configurable applications 135 and/or a remote system associated with developer system 120 that applies definitions to application that are in turn provided to user systems 130. The impressions may include factors similar to that monitored by monitor system(s) 140, such as whether a user system accessed a configurable feature, whether the user used the configurable feature, how long the user interacted with the configurable feature, error rates associated with configurable features, etc. In the embodiments, the data reports, stored performance metrics, and impressions enable application execution management server 110 to determine how configurable applications 135 perform in response to the application of a feature treatment to one or more of configurable applications 135. For example, a newly turned on feature of configurable applications 135 may slow the load time of the applications to an unacceptable time, or a feature treatment that conditionally executes different features leads to a bug with a particular conditional execution. Because application execution management server 110 receives the reports from monitor system(s) 140 and/or impressions before and after feature treatments are applied to configurable applications 135, application execution management server 110 may take one or more actions upon detecting undesirable consequence of execution of a configurable application. That is, if a configurable application's 135 load time exceeds a limit after activation of a new feature, one or more corrective actions may be taken, such as notifying developer system 120 of the problem to enable the developer 120 to change configuration and/or use of the new feature, reverting the configurable application 135 to a previous state by automatically changing the relevant definitions, turning off the feature that was activated, activating a control action by setting relevant definitions, etc. These corrective actions, the order in which they occur, and the timing of when they are taken, may be set by developer system 120 at application execution management server 110.

In embodiments, developer system 120 maintains a great deal of control over the configurable applications 135 that it distributes to end user computer systems (e.g., systems 135). The control includes the ability to roll out new/updated features to select users based on any criteria (e.g., personal selection, geographic region, computing platform type, random selection, percentage of total user systems, etc.). Then based on how the configurable applications perform after feature roll out, they may be rolled back or further released to additional user systems. This provides a safe and easy way for developers to test and distribute new features under real usage conditions, without having to distribute full application releases to every user. Furthermore, when there are unforeseen consequences of a new feature, such as excessive memory usage, slow load times, a bug, etc., the developer may be automatically notified for taking corrective actions. Additionally, and based on preferences of the developer, one or more actions, such as killing a newly deployed feature, reverting an application to a previous state, etc. may be automatically carried out in response to performance monitoring data and/or impressions received by the application execution management server 110. The application execution management server 110 determines, based on the monitoring data, performance factors specified by a developer, etc., how configurable applications 135 perform in response to the application execution management server's detection of certain execution conditions of configurable applications before and after a feature is altered.

Figure 2:
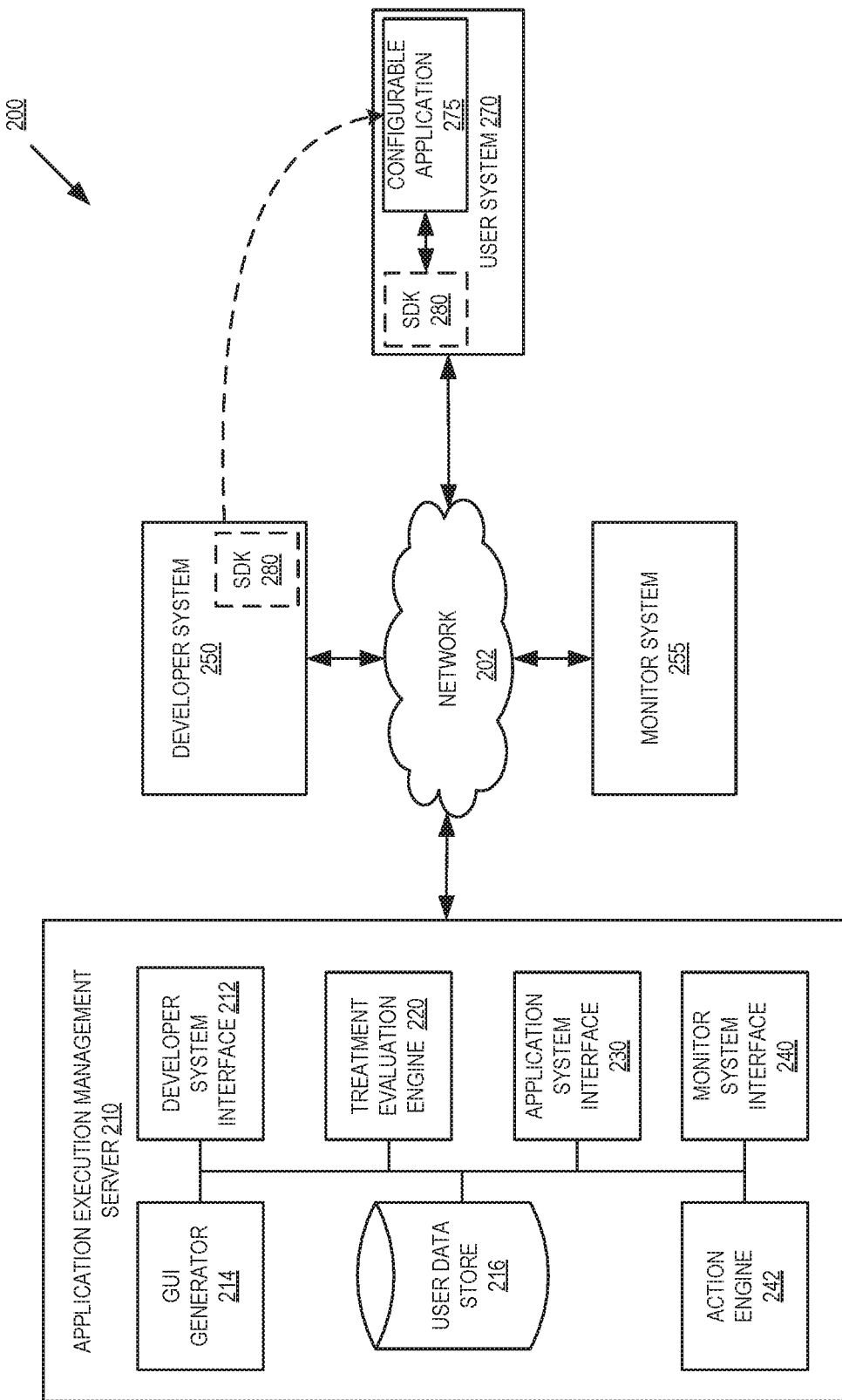
FIG. 2 is a block diagram of one embodiment of a configurable application execution management server, a user system, a developer system, and monitor system(s).

FIG. 2 is a block diagram of one embodiment 200 of an application execution management server 210, a user system 270, a developer system 250 and a monitor system 255. Application execution management server 210 and a user system 270 provide additional details for the application execution management server and user systems discussed above in FIG. 1.

In one embodiment, application execution management server 210 includes a developer system interface 212, graphical user interface (GUI) generator 214, user data store 214, treatment evaluation engine 220, application system interface 230, monitor system interface 240, and action engine 242. User system 270 includes a configurable application 275 and an optional software development kit (SDK). Developer system 250 may also include an SDK 280 for remotely communicating with configurable applications that are distributed to user systems (e.g., web page based applications served from developer system 250), or applications that are remotely controlled by developer system (e.g., a client application that exchanges information with developer system 250). In one embodiment, the application execution management server 210, a user system 270, developer system 250, and monitor system 255 communicate with each other over various networks and network configurations as discussed above in FIG. 1.

In the application management execution server 210, GUI generator 214 is responsible for generating an interface, such as a web page based interface, which is provided to developer system 250 via developer system interface 212. The GUI provides links and information to developer system 250 including links for downloading and installing an SDK 280 in software applications created by developer system 250 and/or installing an SDK 280 at developer system 280. Furthermore, the information includes documentation for inserting feature selection logic within the code of application developed by developer system 250. The combination of the SDK with feature selection logic enables applications, such as configurable application 275, to have application execution be selectively configured at run time, as discussed herein. Developer system 250 may then distribute the configurable application 275 with or without SDK 280 to user system 270. In one embodiment, developer system 250 further interacts with application execution management server 210 to select segments of user systems, set feature treatments (e.g., whether features are turned on/off, what values are used for features, etc.), and set automatic actions and notification preferences, via a user interface generated by GUI generator 214.

In one embodiment, user system 270 is identified by developer system 250 to application execution management server 210 to enable the exchange of definitions messages as discussed herein. However, to respect the privacy of developer system 250 and user system 270, developer system determines how to identify user system 270, such as by an anonymous identifier. The user identifications are stored in user data store 216, along with a method of communicating with associated users. Furthermore, configurable application feature treatments (e.g., turn feature on/off, select feature, etc.), as specified by developer system 250 are also stored in user data store 216 with feature identification values, which are associated with the appropriate user identifiers. In embodiments, developer system 250 may specify a random user selection, feature based user selection (e.g., geographic feature, hardware feature, etc.), etc. to receive a feature treatment, in which case the developer system interface 212 performs the selection and stores the treatment and feature identifier with the selected user identifiers. In embodiments, user data store 216 may be part of application execution management server 210, communicatively coupled but remote to application execution management server 210, represent a distributed user data store, etc.

User system 270 is a computer system that executes the configurable application 275. In one embodiment, the SDK 280 is installed and/or run within the configurable application 275, but may also be run independent of the configurable application 275. In another embodiment, SDK 280 is run at developer system 250 (or other server computer system associated with the developer and which provide the configurable application 275 to user system 270). The SDK 280, whether located at user system 270 or remote to user system 270, is responsible for exchanging messages with the application execution management server 210 through the application system interface 230.

In one embodiment, the SDK 280 at user system 270 communicates at least the user system's 270 identifier (e.g., the anonymous identifier specified by developer system 250) to the application system interface 230 to identify the user system. The treatment evaluation engine 220 then utilizes the user system 270 identifier to obtain any feature treatments to be applied to user system 270 from user data store 216. When feature treatments are found, they are returned to SDK 280. In embodiments, the SDK 280 and application system interface 230 periodically exchange these messages (e.g., SDK requests, and feature/treatments responses) while configurable application 275 is running. Furthermore, the message exchange rate may be configurable by developer, so that messages are exchanged once per second, once per minute, once per hour, once per day, or at any other time interval.

In another embodiment, SDK 280 at developer system 250 may receive updates for one or more users. In embodiments, the one or more users may include all users of the configurable application distributed by developer system 250. Thus, each user may have definitions specified in the updates, which are applied to applications provided to user systems. For example, developer system 250 may receive updates at SDK 280 for web page based applications served by developer system 250. When a configurable web page application is requested by an identified user system 270, the definitions can be applied to the application provided to the user system from a web server. Then when the web page is requested again (e.g., such as when a user refreshes a web page or browses back to the web page), new definitions that have been received by SDK 280 of developer system 250 may be applied to selectively apply treatments to features of the configurable web page application.

After SDK 280, which as discussed above may be part of configurable application 275 or remote to user system 270, receives the feature treatment response from application system interface 230, SDK 280 applies any definitions to identified features. In one embodiment, the definitions are applied to features of configurable application while configurable application is running via feature treatment logic coded into configurable application 275. In another embodiment, the definitions are applied to an application prior to providing the application to a user system 270, and handled by the feature treatment logic when a downloaded application is run at the user system 270. In one embodiment, the feature treatment logic includes a series of conditional statements (e.g., IF, IF THEN, IF THEN ELSE, etc.) that specify what application features are to be executed for a given specified definitions, and for the case when no definitions are specified and/or fits the received definition value, default or control actions can be taken. For example, pseudocode representing the feature selection logic for a received treatment X for a feature F could be:

```
treatment = istreatment (userID, F)
if treatment == X
    then do A for feature
else treatment == Y
    then do B for feature
else
    then do default
```

In the example above, the received treatment X for the feature F would result in A being performed for the feature. If Y were specified as the treatment by one or more definitions, a different action would be performed. Similarly, if a third treatment value (e.g., Z) or no treatment value is defined, then a default action could occur. In embodiments, developer system 250 may specify these treatment values to control how configurable application 275 is executed by user system 270. Furthermore, developer system 250 is free to change the treatment values applicable to user system 270 to test new features, roll back features being tested, kill features that are not executing as expected, etc. These options may be achieved without having to develop, test, and distribute new versions of configurable application 275. Furthermore, the ability of developer system 250 to embed the SDK and/or feature treatment logic provides an application developer great freedom as to the ability to roll out and test new features.

Figure 4:
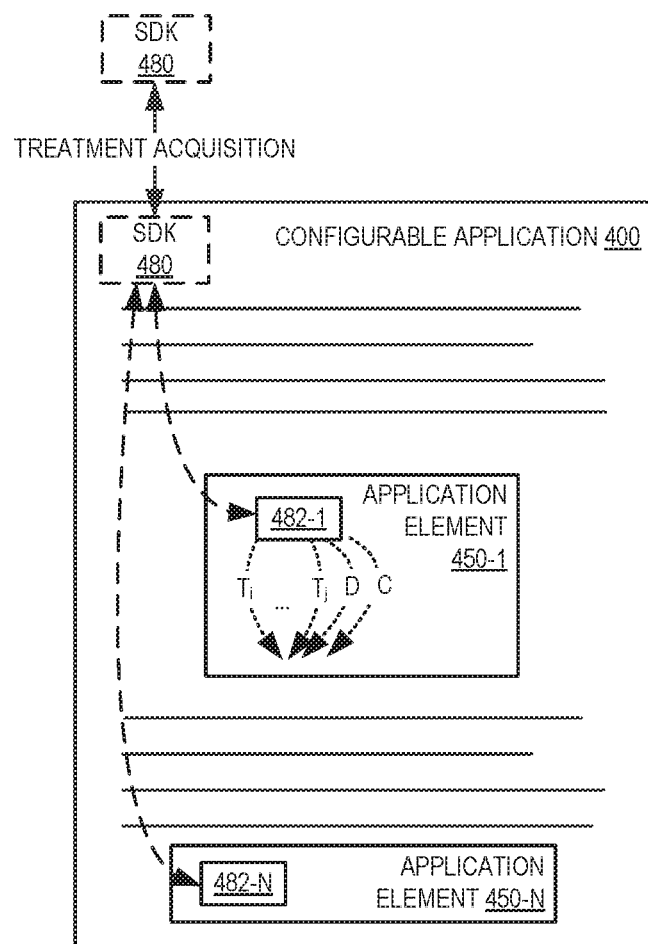
FIG. 4 is an exemplary diagram of a configurable application with configurable execution of elements within the application.

Referring to FIG. 4, an exemplary diagram of a configurable application 400 with configurable execution of elements (e.g., 450-1 through 450-N) within the application is illustrated. The SDK 480 may be within the configurable application 400 (e.g., run as part of a configurable application), may be installed on a user computer system (e.g., installed as a separate application to interact with one or more configurable applications), or may be installed remotely from the configurable application 400 (e.g., running on a remote server that provides configurable applications, such as web page based applications, to an end user system), prior to the user computer system obtaining the configurable application 400. The SDK 480, as discussed herein, exchanges messages with an application execution management server (e.g., server 210). In the message exchange, SDK 480 receives feature IDs and treatment values. Furthermore, when SDK 480 is remote, SDK 480 may also receive segment identifiers that identify groups of users. When an application element, such as application element 450-1 is executed by configurable application 400, the feature treatment logic executes the conditional statements coded into the feature treatment logic 482 based on the definitions applied to the various elements. For example, depending on the definitions received in the message exchange, one of treatments $T_i$ through $T_j$, a default treatment, or a control treatment is applied to application element 450-1. In one embodiment, the default treatment is a feature treatment that can be defaulted to when a definition is not supported or is not specified in feature treatment logic. The control treatment, however, is a treatment that is utilized as a safety, such as turning a feature off, performing a known action, etc. A similar process is executed for the remaining configurable application elements, including application element 450-N. Therefore, configurable application 400 may have several configurable application elements executing therein, and may each be individually controlled by a developer system 250 through the use of application execution management server 210. Furthermore, different user systems executing the same configurable application 400, may be configured differently at execution based on the definitions applied to the configurable application elements.

Returning to FIG. 2, monitor system 255 performs one or more monitoring processes on the user system 270 and/or configurable application 275. Monitor system 255 may be a third party service, such as a bandwidth consumption monitor, web page load time monitor, application or web page crash reporting aggregator, etc. Furthermore, in one embodiment, the processes performed by monitor system 255 may be performed by application execution management server 210, by user system 270, or by developer system 250. Furthermore, SDK 280 operating remotely (e.g., at a web server) or with configurable application 275 may report impressions, such as which features are executed, how long a user used a newly configured feature, etc.

In one embodiment, monitor system interface 240 of application execution management server 210 receives reports from monitor system 255 and/or SDK 280 regarding the one or more monitored application and/or system statistics (e.g., load time, memory usage, crash reports, impressions, etc.). In another embodiment, monitor system interface 240 queries monitor system 255 on a periodic basis for the monitored statistics. In either embodiment, action engine 242 analyzes the monitored statistics to determine whether one or more corrective actions should be taken with respect to an applied feature treatment in configurable application 275. In one embodiment, action engine 242 compares relevant monitored statistics before a feature treatment is applied to configurable application 275 and after application of the feature treatment. Based on the comparison, action engine 242 is able to determine when the execution of a feature and/or treatment is responsible for certain negative consequences, such as slowing web page or application load time, increasing network bandwidth consumption, increase the frequency of application crashing, negative impressions such as lack of new feature use, etc. In one embodiment, all relevant statistics gathered by monitor system 255 are gathered and analyzed by action engine 242 for each configurable application. In another embodiment, developer system 250 may specify certain features to be analyzed by action engine 242.

In one embodiment, when action engine 242 detects one or more predetermined negative consequences in a configurable application 275, action engine performs one or more corrective actions. These corrective actions may include turning a feature off which is detected as a cause of the detected negative consequence, generating a notification (e.g., email, SMS, etc.) to developer system 250 identifying the feature and negative consequence, reverting to an older treatment, etc. In one embodiment, developer system 250 may specify the actions to be performed by action engine 242, including an order in which they are performed. For example, in response to detecting that a newly activated feature of configurable application 275 is causing slow load times, action engine 242 may be configured to notify developer system 250 via email message, and when no corrective action is detected (e.g., adjustment of feature treatment values for the aforementioned newly activated feature) within a certain amount of time, the feature may be killed (e.g., turned off).

In embodiments, developers may easily roll out, test, and roll back features of configurable applications for selected groups of users using application execution management server 210. Furthermore, when there are unforeseen negative consequence of feature deployment, application execution management server 210 may automatically take one or more corrective actions to remedy the unforeseen consequences, including turning off features detected to be causing the negative consequences. Thus, developer freedom to test and deploy new features to any type of application is greatly expanded without hampering usability of applications on end user computer systems.

Figure 3:
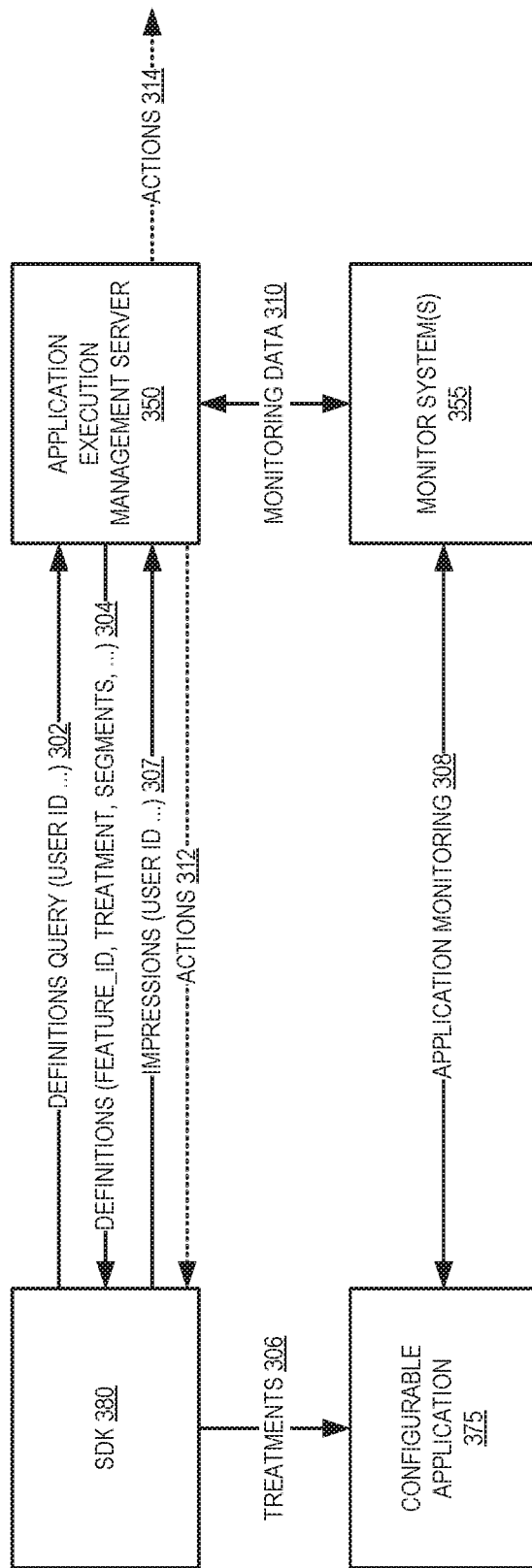
FIG. 3 is a block diagram illustrating one embodiment of communications exchanged between a configurable application execution management server, a software development kit (SDK), a configurable application, and monitor system(s).

FIG. 3 is a block diagram illustrating one embodiment of communications exchanged between application execution management server 350, SDK 380, configurable application 375, and one or more monitor system(s) 355. The functions and/or processes performed by application execution management server 350, SDK 380, configurable application 375, and one or more monitor system(s) 355 may be performed by a processing logic that may comprise hardware (circuitry, dedicated logic, etc.), software (such as is run on a general purpose computer system or a dedicated machine), firmware, or a combination.

In FIG. 3, it is assumed that the configurable application 375 is developed with feature treatment logic as discussed herein. Furthermore, SDK 30 may either be an SDK installed at a client running the configurable application 375 or installed at a server that provides and/or controls a configurable application to users systems. SDK 380 periodically exchanges messages with application execution management server 350. A definitions query message 302 sent by SDK 380 to application execution management server 350 includes at least credentials associated with a particular developer system to identify to server 350. In one embodiment, the query message 302 may also include identifiers, such as application identifiers indicating which applications are installed and/or running on user systems.

Application execution management server 350 utilizes the credentials to look up treatments (e.g., configurable options definitions) for one or more features of configurable application 375. As discussed herein, the treatments may be specified by a developer using one or more definitions, and stored in a user data store at application execution management server 350. Application execution management server 350 responds 304 to SDK 380 with definitions that include at least feature identifiers, associated treatment values, and optionally segments. The received definitions are then applied 306 to features in the configurable application 375 based on the feature identifiers and associated treatment values. Furthermore, when a segment is provided, SDK 380 may optionally apply the definitions to only those configurable applications falling within the segment (e.g., specific user groups), or configurable application 375 will apply definitions based on its analysis of the segments. In one embodiment, application execution management server 350 responds with the treatment information based on receipt of requests from SDK 380. However, in another embodiment, after an initial request by SDK 380, application execution management server 350 may periodically report the definitions, and any changes received, until an updated definitions query 302 is received.

While SDK 380 and application execution management server 350 are exchanging definitions messages, monitor system(s) 355 collects 308 one or more application execution performance statistics. For example, monitor system(s) 355 may measure web page load times, network bandwidth consumption, receive crash reports, etc. Monitor system(s) 355 may periodically collect the application execution performance statistics, or may perform a monitoring operation in response to a notification from application execution management server 350 that a treatment is/has been applied to configurable application 375.

The application execution performance statistics are then communicated 310 to application execution management server 350. Similarly, SDK 380 may also send 307 impressions data, including user IDs, treatments, etc., indicative of when a configured feature is accessed, by which system, what treatment was applied, etc. by a configurable application 370 (e.g., did a specific user's configurable application 375 execute a feature, did the user selected a feature, did the user remain on a feature, did an error occur when a feature was accessed, etc.). In one embodiment, the impressions 307 may be accumulated by SDK 380 for a period of time (e.g., 1 minute, 5 minutes, etc.) and sent as a batch to application execution manager 350. Application execution management server 350 uses the received statistics and/or impressions to determine when applications are executing within expected parameters, and when applications are not executing within expected operating parameters. Application execution management server 350 may then take one or more corrective actions 314 in response to reverse the negative consequences from application of specific feature treatment(s).

For example, enabling the display of a new user interface feature may cause a configurable application 375 to load slowly and then crash. Similarly, the new user interface feature may be avoided by users who are not satisfied with the functioning of the feature. Monitoring system(s) 355 could detect loading times, crashes, and inferred negative user experiences of the configurable application and communicate the application execution statistics and/or impressions to application execution management server 350. Application execution management server 350 could compare the relevant collected statistics for configurable application 375 before and after the new user interface feature is activated to determine that the cause of the slow loading and crashes is based, at least in part, by the new user interface feature. Application execution management server 350 could then notify a developer of this, the negative impressions, and/or could turn the new user interface feature off (e.g., provide new definitions 304 that are applied by the SDK 380 and application 375) to remedy the loading/crashing/impressions problems experienced by configurable application 375.

Figure 5:
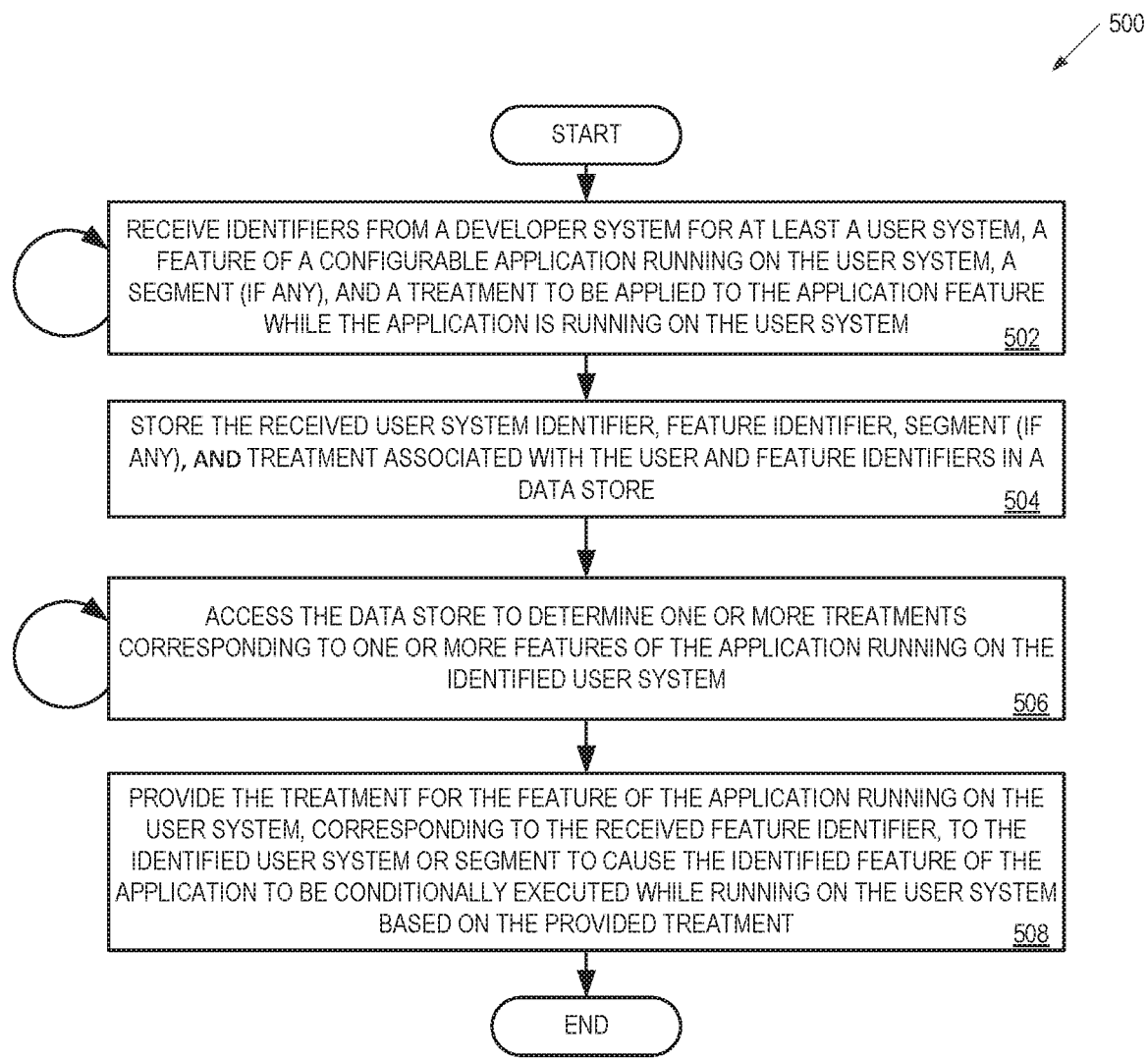
FIG. 5 is a flow diagram of one embodiment of a method for providing treatments for features to configurable applications.

FIG. 5 is a flow diagram of one embodiment of a method 500 for providing treatments for features to configurable applications. The method 500 is performed by processing logic that may comprise hardware (circuitry, dedicated logic, etc.), software (such as is run on a general purpose computer system or a dedicated machine), firmware, or a combination. In one embodiment, the method 500 is performed by an application execution management server 110, 210, or 350.

Referring to FIG. 5, processing logic begins by receiving identifiers from a developer system for at least a user system, a feature of a configurable application running on the user system, a segment (if any) and a treatment to be applied to the application feature while the application is running on the user system (processing block 502). In one embodiment, developer system is responsible for developing and distributing a configurable application to the user computer system, and including the conditional feature treatment logic within the configurable application, as discussed herein. Processing logic may therefore receive, from the developer system, identifiers that uniquely and/or anonymously identify different user systems that are running the identified application. The treatments associated with the identified user systems and applications may be different, such that the developer system can specify different treatments for different users or segments of user, such as users from different companies (e.g., corporation X, corporation Y, etc.), geographic regions (e.g., North America, Europe, Asia, etc.), user class (e.g., premier, standard, etc.), user type (e.g., beta testers, paying users, etc.), as well as other user groups. Furthermore, processing logic may periodically receive, from the developer system, updated user system identifiers, segments, and treatments to be applied to applications running on the identified user systems.

Processing logic stores the received user system identifier, feature identifier, segment (if any), and treatment associated with user and feature identifiers in a data store (processing block 504). In one embodiment, the user system identifier is unique and/or anonymous to processing logic. Thus, processing logic may maintain the features and associated treatments to user systems, without knowledge of who the user systems are associated with. This is beneficial to maintaining the privacy of end user systems/clients of the developer system.

Processing logic accesses the data store to determine one or more treatments corresponding to one or more features of the application running on the identified user system (processing block 506). The treatments for the features of the application running on the user system, corresponding to the received feature identifier, are provided to the identified user system to cause the identified feature of the application to be conditionally executed while running on the user system based on the provided treatment (processing block 508). In embodiments, the treatment of the feature is provided to an SDK that applies one or more definitions to configure the feature. Furthermore, the SDK may either be remote to the remote application when serving a configurable application to a user system, or installed at the user system or within the application, as discussed herein. In one embodiment, the access to the data store by processing logic may be performed on a periodic basis, such as once every second, minute, hour, in response to a query by a user system, etc. In another embodiment, the developer may configure how frequently processing logic accesses the data store. In either embodiment, the periodic access to the data store is performed to propagate updated treatment values, as specified by a developer at processing block 502, to be distributed to user systems.

Figure 6A:
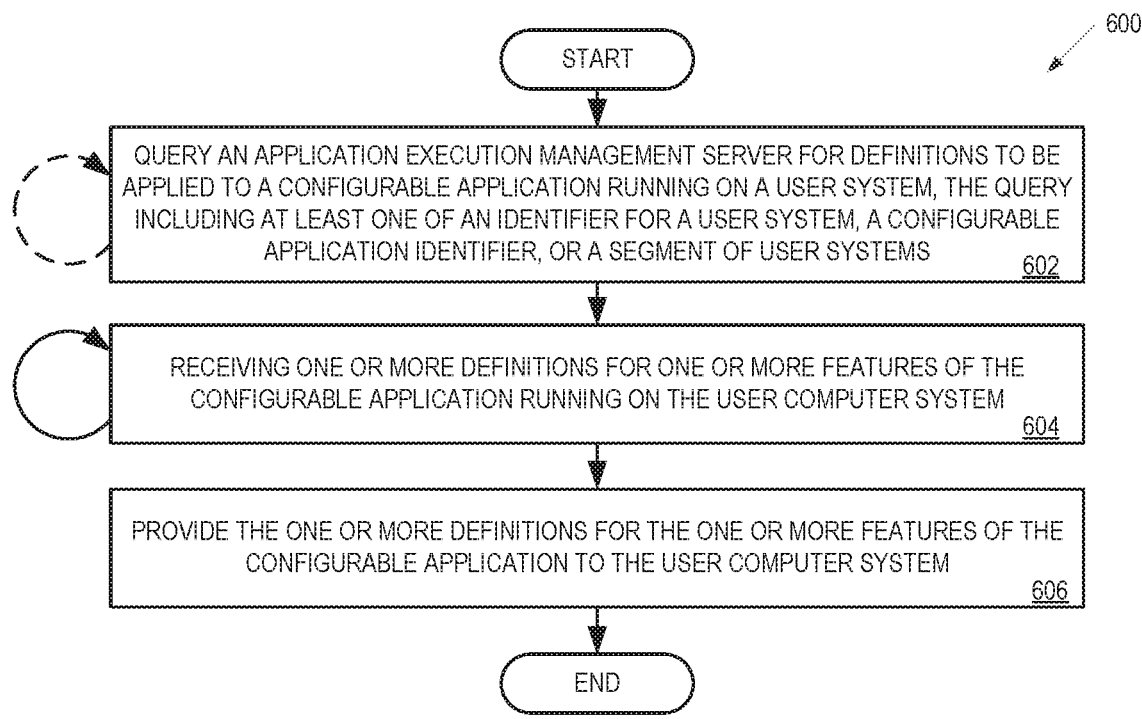
FIG. 6A is a flow diagram of one embodiment of a method 600 for an SDK obtaining definitions for a configurable application.

FIG. 6A is a flow diagram of one embodiment of a method 600 for an SDK obtaining definitions for a configurable application. The method 600 is performed by processing logic that may comprise hardware (circuitry, dedicated logic, etc.), software (such as is run on a general purpose computer system or a dedicated machine), firmware, or a combination. In one embodiment, the method 600 is performed by an SDK, such as SDK 280 or 380.

Referring to FIG. 6A, processing logic begins by querying an application execution management server for definitions to be applied to a configurable application running on a user system, the query including developer system credentials and optionally one of an identifier for the user system, a configurable application identifier, or a segment of user systems (processing block 602). Processing logic then receives one or more definitions for one or more features of the configurable application running on the user system (processing block 604). In one embodiment, processing logic may only send an initial query to the application execution management server, for example when the application is started on the user system, and then receives periodic treatment definitions as discussed above in FIG. 5. In another embodiment, processing logic may optionally send periodic queries for treatment definitions, and receive responses with treatment definitions, as discussed herein. Processing logic then provides the one or more definitions for the one or more features of the configurable application to the user computer system (processing block 606). In one embodiment, the developer system credentials are used by processing logic to access treatment definitions, segment definitions, etc. associated with an SDK of a developer deployed at a client or remote system.

Figure 6B:
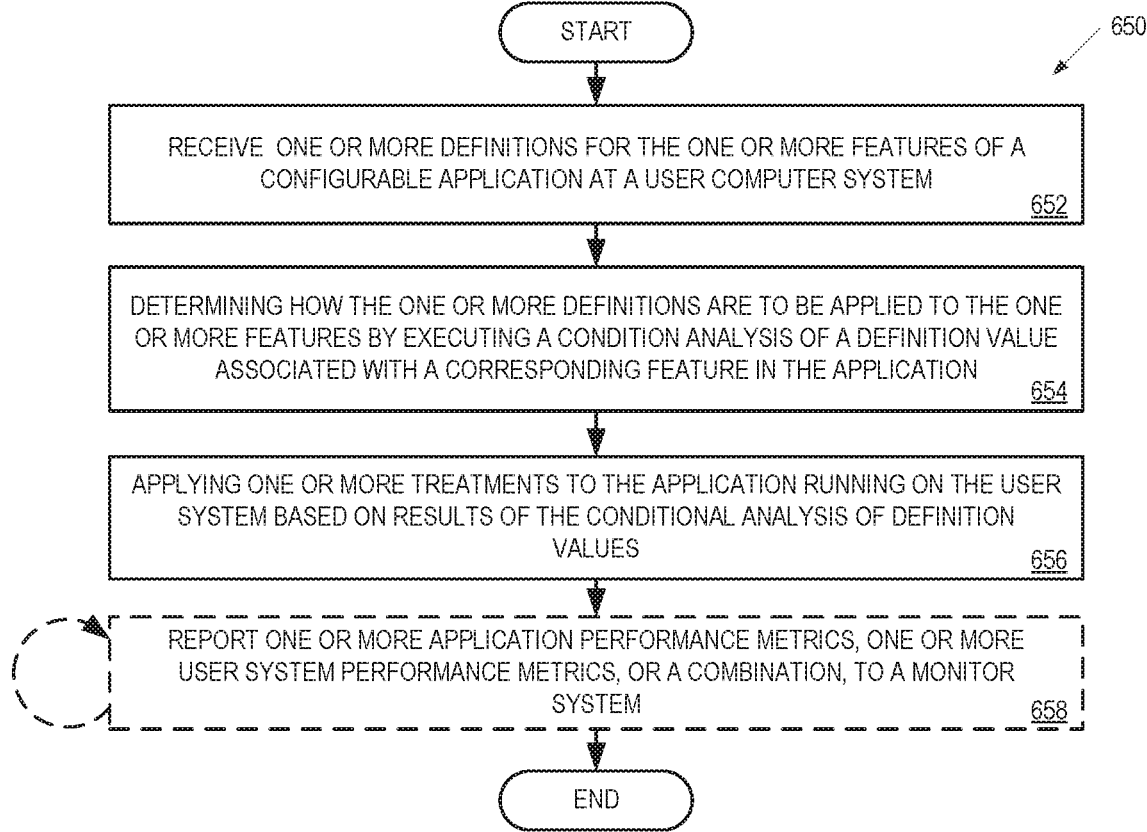
FIG. 6B is a flow diagram of one embodiment of a method for a configurable application applying definitions provided by an SDK.

FIG. 6B is a flow diagram of one embodiment of a method 650 for a configurable application applying definitions provided by an SDK. The method 650 is performed by processing logic that may comprise hardware (circuitry, dedicated logic, etc.), software (such as is run on a general purpose computer system or a dedicated machine), firmware, or a combination. In one embodiment, the method 600 is performed by a configurable application running on a user system, such as configurable application 135, 275, or 375.

Referring to FIG. 6B, processing logic begins by receiving one or more definitions for the one or more features of a configurable application at a user computer system (processing block 652). As discussed herein, the application of definitions to configurable applications may be based on receipt of those definitions by an SDK of a developer system or an SDK of a configurable application. Processing logic determines how the one or more definitions are to be applied to the one or more features by executing a conditional analysis of a definition value associated with a corresponding feature in the application (processing block 654). In one embodiment, the conditional analysis includes execution of a feature treatment logic, as discussed above in FIG. 4, such as execution of a series of conditional statements within the running application based on the feature value. Utilizing the analysis of the feature treatment logic, processing logic applies the one or more treatments to the application running on the user system based on results of the conditional execution analysis of definition values (processing block 656). In one embodiment, a segment definition may also be evaluated by processing logic to determine whether a treatment should be applied (e.g., determine whether a user system and/or user is associated with a segment to receive and apply a treatment). Because a configurable application may be changed based on new definitions, the determination of how to apply the treatments and then application of the treatments enables processing logic to configure the execution of the configurable application while the application is running. For example, a user interface element may be activated or deactivated based on a received treatment value. As another example, an accepted credit card for a transaction may be changed in an application from Card X to Card Y. These examples are not intended to limit the present description, but merely show potential uses for configuring an application run at an end user system. In these examples, the application can be updated, tested, rolled back, etc. without having to distribute new application.

In one embodiment, processing logic optionally reports one or more application performance metrics, one or more user system performance metrics, one or more impressions, or a combination, to a monitor system (processing block 658). In one embodiment, application performance metrics could include such metrics as load time, memory access times, function execution times, etc. User system performance metrics could include such metrics as memory usage, processor usage, power usage, etc. These performance metrics, including a combination of factors may be reported to, or gathered by, a monitor system for use as discussed herein. Furthermore, the performance metrics may include impressions reported by an SDK about the execution of the configurable application, such as when a treatment is evaluated by conditional execution logic, an error when applying a treatment, etc.

Figure 7:
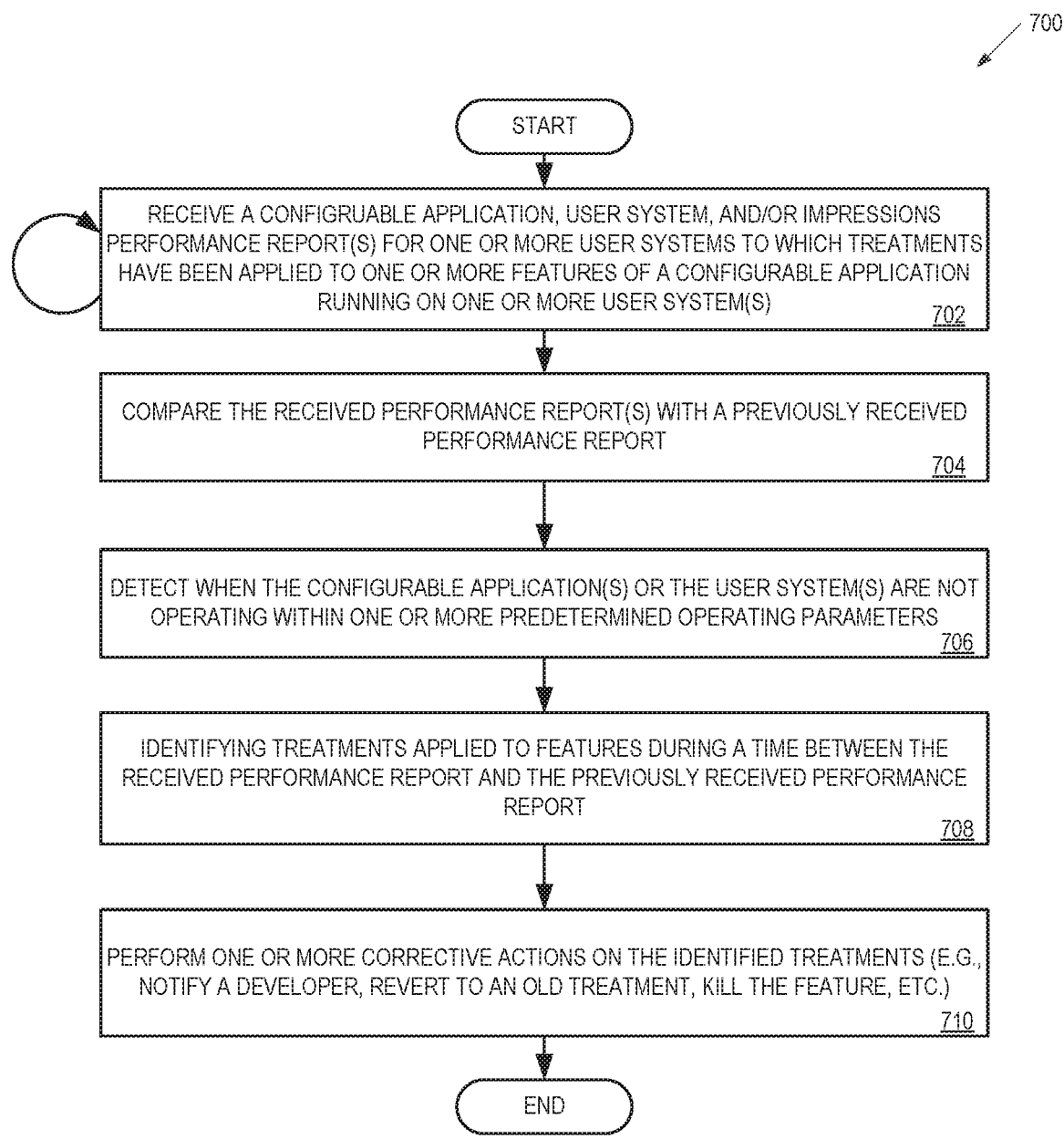
FIG. 7 is a flow diagram of one embodiment of a method for performing corrective actions based on performance analysis of application of treatments to a configurable application running on a user system.

FIG. 7 is a flow diagram of one embodiment of a method for performing corrective actions based on performance analysis of application of treatments to a configurable application running on a user system. The method 700 is performed by processing logic that may comprise hardware (circuitry, dedicated logic, etc.), software (such as is run on a general purpose computer system or a dedicated machine), firmware, or a combination. In one embodiment, the method 700 is performed by an application execution management server 110, 210, or 350.

Referring to FIG. 7, processing logic begins by receiving an application, user system, and/or impressions performance report(s) for a user system to which treatments have been applied to one or more features of a configurable application running on one or more user system (processing block 702). In embodiments discussed herein, the performance reports may be received on a periodic basis from one or more third party monitor systems. Additionally, processing logic may receive performance reports and/or impressions from the user or developer systems, such as by a reporting of an SDK (e.g., SDK 280 or 380).

Processing logic compares the received performance report(s) with a previously received performance report (processing block 704). In one embodiment, the comparison enables processing logic to evaluate the effect of a feature treatment change, such as an increase in reported error rates. In one embodiment, the comparison enables processing logic to further detect trends in an application, such as increased memory usage, decreased processor usage, increased application load time, decreased user satisfaction, etc. from one reporting to another, as well as trends over time. Furthermore, these reports may be collected for a plurality of users to determine usage trends from a larger group of users (e.g., a significant portion of users are experience computing slow down, a segment of users negatively perceives a newly configured feature, etc.).

Processing logic detects when the configurable application(s) or the user system(s), associated with the reports, are not operating within one or more predetermined operating parameters (processing block 706). The predetermined operating parameters may include threshold values set by a developer system that define maximum error rates, allowable time limits, usage variables, etc. Furthermore, the predetermined operating parameters may be based on an established baseline value, such as increase over a previous value more than 10% (e.g., increase of an applications load to from a previous time period by 10%, increased power usage by more than 5%, etc.). Furthermore, trending values in a certain direction can be specified in the predetermined operating parameters to determine, for example, when an application's performance is trending in a negative way.

Processing logic identifies treatments applied to features during a time between the received performance report and the previously received performance report (processing block 708). In one embodiment, the identified treatments are the new and/or updated treatments that were applied to the application running on the user system in between the performance reports. When one or more of the user system and/or application go out of predetermined operating parameters, and one or more new treatments are identified as having been applied, those treatments can be singled out as potentially being contributory factors to the non-optimal functioning of the application and/or user system.

Processing logic therefore performs one or more corrective actions on the identified treatments (processing block 710). Because the identified treatments are potential contributory factors to the non-optimal functioning of the application and/or user system, the corrective actions may include notifying a developer of the treatment change along with the performance reports. This would enable a developer to internally determine whether the changed/updated/new feature definitions are indeed responsible for the changed performance of the application and/or user system, and how to best remedy the current situation (e.g., changing the treatment value as discussed in FIG. 5). Furthermore, if the detected degraded performance or user perception of a feature of an application exceeds a certain threshold, as determined by the application execution management server or by the developer, processing logic's corrective actions could include automatically reverting changed features to old definition values, and generating the report to the developer. Additionally, features may be turned off or set to a control treatment when performance metrics exceed predetermined threshold values, which may be the same or different from the threshold values associated with developer notification and treatment reversion.

Figure 8:
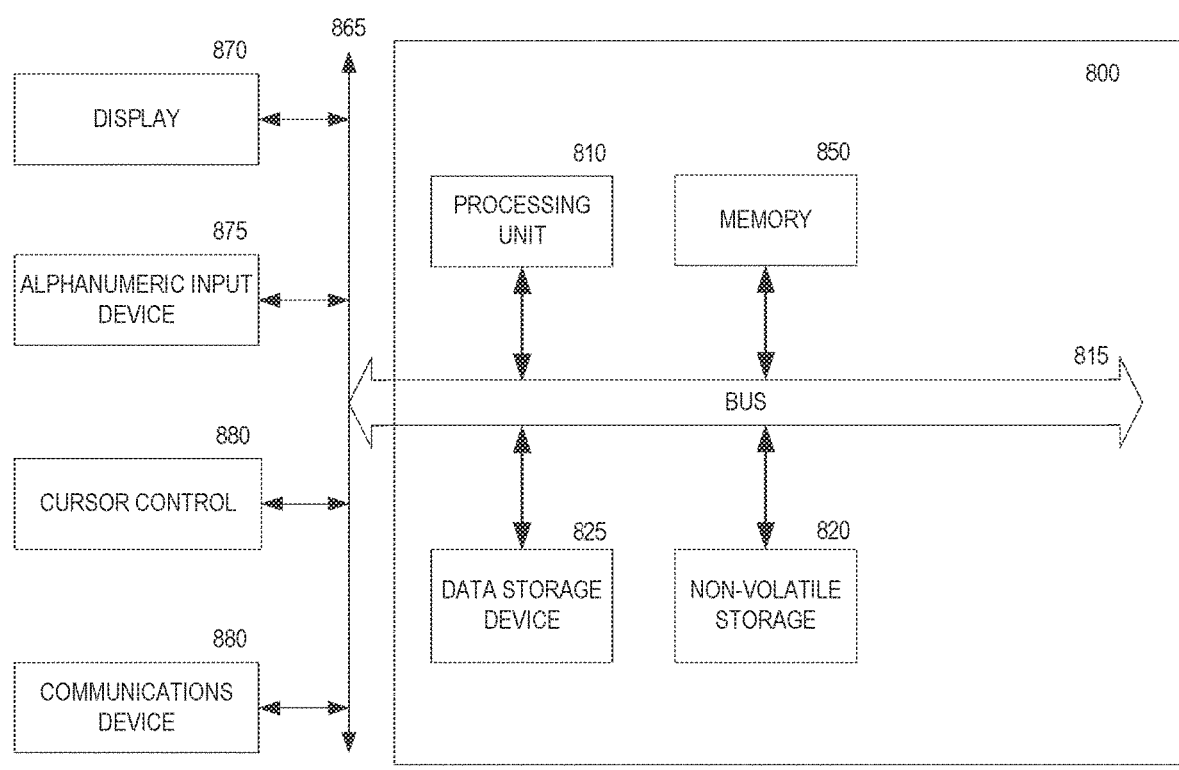
FIG. 8 is one embodiment of a computer system that may be used in accordance with an embodiment of the invention.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

In one embodiment, the access to electronic communications, tracking of communications, extraction of contact, collaborator, and relationship data from the electronic communications, and sharing of electronic communications is predicated on the privacy controls maintained by a relationship management server. The privacy controls enable users to select what data should be shared with participants (i.e., relationships and collaborators) within a process, what data should be tracked, what data from one user can be shared, displayed, or used by a second user, etc. In one embodiment, these privacy controls may initially be set to a maximum degree of privacy, such that no data is shared, obtained, or tracked. A user may then opt-into one or more of the data acquisition, tracking, and sharing processes discussed herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer implemented method, comprising:
   receiving, at a server computer system, an identifier specified by a developer of an application for a user system remote to the server computer system, an identifier of a feature of the application running on the user system, and one or more definition values that define a treatment that configures execution of the application feature within the running application, wherein the identifier for the user system is associated with a method of communication with the user system and is a unique developer reference value that provides identification of the user system anonymously to the server computer system;
   storing, in a memory of the server computer system, the identifier for the user system with the association to the method of communication, the identifier of the feature of an application running on the user system, and the one or more definition values to be applied to the application feature;
   configuring the application during runtime execution of the application at the user system, by a processing system executing a software development kit (SDK), based on the definition values distributed by the server using the method of communication to the processing system based at least in part on the identifier for the user system stored in the memory, wherein a series of conditional statements are executed by the running application for conditional execution analysis of a treatment value defined for the application feature in the definition values, wherein a result of the conditional execution analysis of the treatment value for the application feature configures actions of the application feature defined for the treatment value for execution within the running application at the user system, wherein each of the series of conditional statements specifies a different execution of the application feature; and receiving, at the server computer system, two or more performance reports comprising data indicative of an interaction of the user with the feature, wherein the two or more performance reports comprise performance reports generated before and after different treatments are applied to the feature within the running application at the user system; comparing interactions of the user with the feature from one or more performance reports received before the definition values have configured a first treatment of the feature within the application, with interactions of the user with the feature from one or more performance reports received after the definition values configure a second treatment of the feature within the application, wherein a result of the comparison determines a negative impact of feature treatment on an engagement of the user with the feature, the application, or a combination thereof; configuring the feature in the running application with a treatment that avoids the negative impact based on the result of the comparison.

2. The method of claim 1, further comprising: periodically accessing, based on the received identifier for the user system, the memory to determine one or more definition values to be applied to a corresponding one or more features of the application; and providing the determined one or more definition values corresponding to the one or more features to the SDK to configure the one or more features with the one or more definition values.

3. The method of claim 1, wherein the identifier for the user system, the identifier of the feature of an application running on the user system, and the definition values to be applied to the application feature are received from a developer system responsible for developing the application running at the user system.

4. The method of claim 1, further comprising: receiving, at the server computer system, two or more performance reports generated before and after different treatments are applied to the feature within the running application at the user system; comparing a performance report received before the definition values have configured a first treatment of the feature within the application with a performance report received after the definition values configure a second treatment of the feature within the application, wherein a result of the comparison indicates an impact of feature treatment on the application, the user system, or a combination thereof; based on results of the comparison, detecting that the application running at the user system, the user system, or a combination thereof are not operating within one or more predetermined operating parameters; and performing one or more corrective actions with respect to the feature within the running application.

5. The method of claim 4, wherein performing the one or more corrective actions comprises: providing different definition values to change a configuration of the application feature at the user system.

6. The method of claim 5, wherein providing the different definition values comprises providing a definition that deactivates the application feature within the application.

7. The method of claim 4, wherein the performance reports include data indicative of one or more performance metrics associated with the application comprising one or more of application error rates, application load time, application execution time, memory access by the application, usage of the application feature, or a combination thereof.

8. The method of claim 4, wherein performing the one or more corrective actions comprises: generating a notification that comprises an identification of the feature and data from the performance reports indicative of the application running at the user system, the user system, or the combination thereof that are detected not to be operating within the one or more predetermined operating parameters; and providing the notification to the developer of the application.

9. The method of claim 4, further comprising: determining, based on results of the comparison, a trend in the one or more predetermined operating parameters over a period of time, wherein the trend is indicative of the application not operating within the one or more predetermined operating parameters.

10. The method of claim 1, wherein the one or more predetermined operating parameters are received from a developer of the application.

11. The method of claim 1, further comprising: receiving, at the server computer system, a performance report associated with the execution of the application at the user system; detecting when the application running at the user system, the user system, or a combination thereof are not operating within one or more predetermined operating parameters based on the performance report; and performing one or more corrective actions with respect to the feature when the detecting is performed after the treatment configures the feature within the application.

12. The method of claim 1, wherein the definition values configure the feature within the application without reinstallation of the application at the user system.

13. The method of claim 1, wherein the user system is a member of a first subset of a plurality of user systems identified as a segment of users, wherein each member of the first subset of the plurality of user systems is provided with the definition values for configuring the application feature, and wherein each member of a second subset of the plurality of user systems is provided with different definition values for configuring the application feature.

14. The method of claim 1, wherein the SDK is installed in the application, and wherein the application accesses the definition values from the SDK for configuring the application while the application is running at the user system.

15. The method of claim 1, wherein the SDK is run in a system communicatively coupled with the application, and wherein the system applies the definition values to the application feature prior to providing the application to the user system.

16. A non-transitory computer readable storage medium including instructions that, when executed by a processor, cause the processor to perform a method comprising:

receiving, at a server computer system, an identifier specified by a developer of an application for a user system remote to the server computer system, an identifier of a feature of an application running on the user system, and one or more definition values that define a treatment that configures execution of the application feature within the running application, wherein the identifier for the user system is associated with a method of communication with the user system and is a unique developer reference value that provides identification of the user system anonymously to the server computer system;

storing, in a memory of the server computer system, the identifier for the user system with the association to the method of communication, the identifier of the feature of an application running on the user system, and the one or more definition values to be applied to the application feature;

configuring the application during runtime execution of the application at the user system, by a processing system executing a software development kit (SDK), based on the definition values distributed by the server using the method of communication to the processing system based at least in part on the identifier for the user system stored in the memory, wherein a series of conditional statements are executed by the running application for conditional execution analysis of a treatment value defined for the application feature in the definition values, wherein a result of the conditional execution analysis of the treatment value for the application feature configures actions of the application feature defined for the treatment value for execution within the running application at the user system, wherein each of the series of conditional statements specifies a different execution of the application feature; and receiving, at the server computer system, two or more performance reports comprising data indicative of an interaction of the user with the feature, wherein the two or more performance reports comprise performance reports generated before and after different treatments are applied to the feature within the running application at the user system; comparing interactions of the user with the feature from one or more performance reports received before the definition values have configured a first treatment of the feature within the application, with interactions of the user with the feature from one or more performance reports received after the definition values configure a second treatment of the feature within the application, wherein a result of the comparison determines a negative impact of feature treatment on an engagement of the user with the feature, the application, or a combination thereof; configuring the feature in the running application with a treatment that avoids the negative impact based on the result of the comparison.

17. The non-transitory computer readable storage medium of claim 16, further comprising: periodically accessing, based on the received identifier for the user system, the memory to determine one or more definition values to be applied to a corresponding one or more features of the application; and providing the determined one or more definition values corresponding to the one or more features to the SDK to configure the one or more features with the one or more definition values.

18. The non-transitory computer readable storage medium of claim 16, further comprising: receiving, at the server computer system, a performance report associated with the execution of the application at the user system; detecting when the application running at the user system, the user system, or a combination thereof are not operating within one or more predetermined operating parameters based on the performance report; and performing one or more corrective actions with respect to the feature when the detecting is performed after the treatment configures the feature within the application.

19. The non-transitory computer readable storage medium of claim 16, wherein the SDK is installed in the application, and wherein the application accesses the definition values from the SDK for configuring the application while the application is running at the user system.

20. The non-transitory computer readable storage medium of claim 16, wherein the SDK is run in a system communicatively coupled with the application, and wherein the system applies the definition values to the application feature prior to providing the application to the user system.

21. A system, comprising:

A server computer system comprising a memory and a processor coupled with the memory, the processor configured to:

receive an identifier for a user system, an identifier specified by a developer of an application of a feature of the application running on the user system, and one or more definition values that define a treatment to be applied to the application feature, wherein the identifier for the user system is associated with a method of communication with the user system and is a unique developer reference value that provides identification of the user system anonymously to the server computer system, and storing, in the memory, the identifier for the user system with the association to the method of communication, the identifier of the feature of an application running on the user system, and the definition values to be applied to the application feature;

a processing system including another processor to receive the definition values from the server computer system and configures the application during runtime execution of the application at the user system via a software development kit (SDK) based on the definition values distributed by the server using the method of communication to the processing system based at least in part on the identifier for the user system stored in the memory, wherein a series of conditional statements are executed by the running application for conditional execution analysis of a treatment value defined for the application feature in the definition values, wherein a result of the conditional execution analysis of the treatment value for the application feature configures actions of the application feature defined for the treatment value for execution within the running application at the user system, wherein each of the series of conditional statements specifies a different execution of the application feature; and receive, at the server computer system, two or more performance reports comprising data indicative of an interaction of the user with the feature, wherein the two or more performance reports comprise performance reports generated before and after different treatments are applied to the feature within the running application at the user system; comparing interactions of the user with the feature from one or more performance reports received before the definition values have configured a first treatment of the feature within the application, with interactions of the user with the feature from one or more performance reports received after the definition values configure a second treatment of the feature within the application, wherein a result of the comparison determines a negative impact of feature treatment on an engagement of the user with the feature, the application, or a combination thereof; configuring the feature in the running application with a treatment that avoids the negative impact based on the result of the comparison.

22. The system of claim 21, wherein the server computer system is further configured to: periodically access, based on the received identifier for the user system, the memory to determine one or more definition values to be applied to a corresponding one or more features of the application; and provide the determined one or more definition values corresponding to the one or more features to the SDK to configure the one or more features with the one or more definition values.

23. The system of claim 21, wherein the server computer system is further configured to: receive a performance report associated with the execution of the application at the user system; detecting when the application running at the user system, the user system, or a combination thereof are not operating within one or more predetermined operating parameters based on the performance report; and performing one or more corrective actions with respect to the feature when the detecting is performed after the treatment configures the feature within the application.

24. The system of claim 21, wherein the SDK is installed in the application, and wherein the application accesses the definition values from the SDK for configuring the application while the application is running at the user system.

25. The system of claim 21, wherein the SDK is run in a system communicatively coupled with the application, and wherein the system applies the definition values to the application feature prior to providing the application to the user system.

* * * * *